Figure 5:
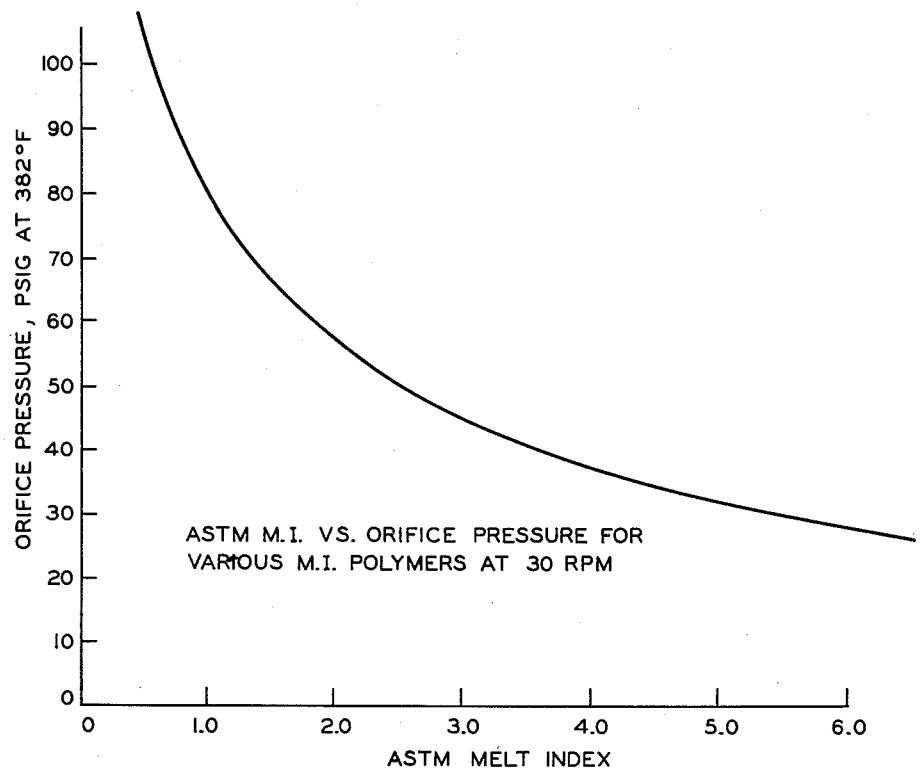

Aug. 7, 1962     C. G. DE HAVEN     3,048,030
MELT INDEX APPARATUS

Filed May 29, 1958     3 Sheets-Sheet 1

INVENTOR.
C. G. DE HAVEN

BY *Hudson and Young*
ATTORNEYS

Aug. 7, 1962   C. G. DE HAVEN   3,048,030
MELT INDEX APPARATUS

Filed May 29, 1958   3 Sheets-Sheet 3

INVENTOR.
C.G. DE HAVEN

BY Hudson and Young
ATTORNEYS

# United States Patent Office 3,048,030
Patented Aug. 7, 1962

---

3,048,030
MELT INDEX APPARATUS
Clark G. De Haven, Bartlesville, Okla., assignor to Phillips Petroleum Company, a corporation of Delaware
Filed May 29, 1958, Ser. No. 738,684
13 Claims. (Cl. 73—56)

This invention relates to apparatus for determining the melt index of polymeric materials. In one aspect, the invention relates to apparatus for continuously measuring a property which is a function of melt index. In another aspect, the invention relates to apparatus for continuously measuring a property which is a function of melt index, calibrated to provide a direct visual reading of melt index.

In the manufacture of polymers such as normally solid polymers of 1-olefins, certain properties of the polymers are frequently utilized for control purposes. One of the properties more usually employed is melt index, which characterizes the processability of the polymers and is also an indication of polymer molecular weight. Melt index is measured according to the ASTM Test D-1238-52T. In this test, the rate of extrusion in grams per 10 minutes (through an orifice 0.0825 inch in diameter and 0.215 inch in length) is determined for polymer at 190° C. under the weight of a piston having a diameter of 0.373 inch and weighing 2,160 grams. The apparatus utilized for determining melt index is defined in the ASTM Manual as a "dead weight piston plastometer." As used in the following discussion, the term "melt index" defines the polymer property determined according to the procedure set forth in ASTM D-1238-52T.

It is an object of this invention to provide apparatus for measuring the melt index of polymers.

Another object of the invention is to provide an apparatus for continuously measuring a property which is a function of polymer melt index.

Still another object of the invention is to provide apparatus for measuring and continuously indicating melt index.

Yet another object of the invention is to provide a compact apparatus for continuously measuring and indicating polymer melt index.

These and other objects of the invention will become more readily apparent from the following detailed description and discussion.

The foregoing objects are achieved in one aspect by providing an apparatus comprising in series a source of flowing polymer, positive displacement means for moving said polymer, an orifice and means for measuring pressure upstream of said orifice, calibrated to provide a visual reading of melt index.

In another aspect of the invention, the pressure upstream of the orifice is maintained constant by regulating the speed of the positive displacement means, said speed being measured by means calibrated to provide a visual reading of melt index.

In still another aspect of the invention, there is provided an apparatus for measuring melt index comprising a single piece hexahedral block having an inlet for receiving polymer communicating with a first outlet for introducing polymer to a detachable positive displacement pumping means and a second outlet for bypassing said pumping means, a second inlet for receiving polymer discharged from said pumping means and a third outlet having a recessed portion adapted to contain a removable orifice, said latter outlet communicating with the second inlet.

Figure 1:
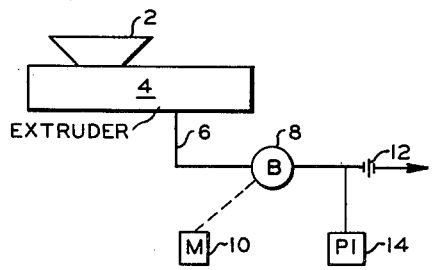
Figure 2:
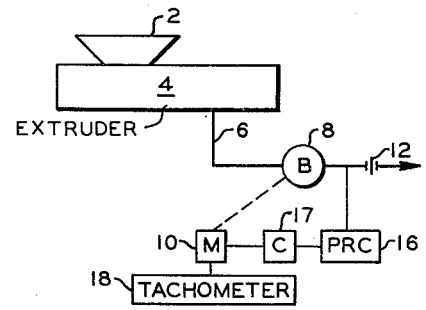
Figure 4:
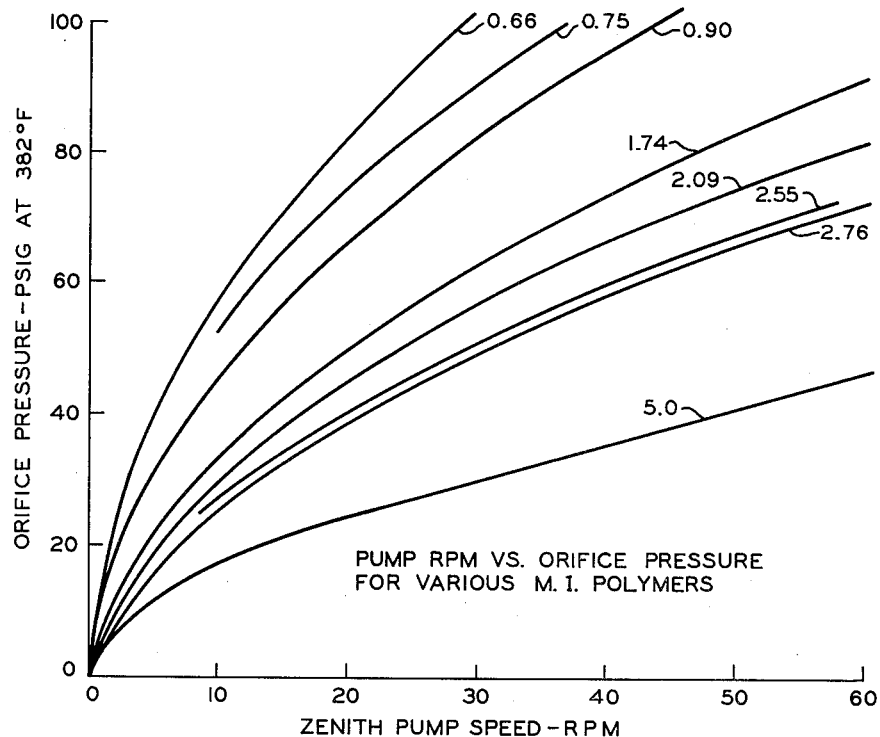
Figure 6:
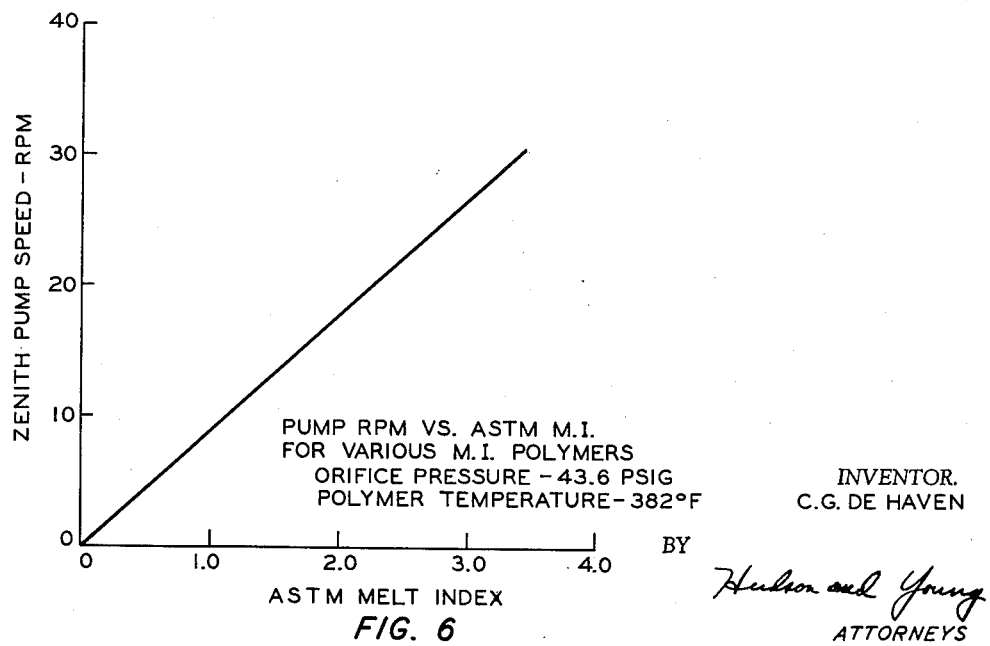
Figure 3:
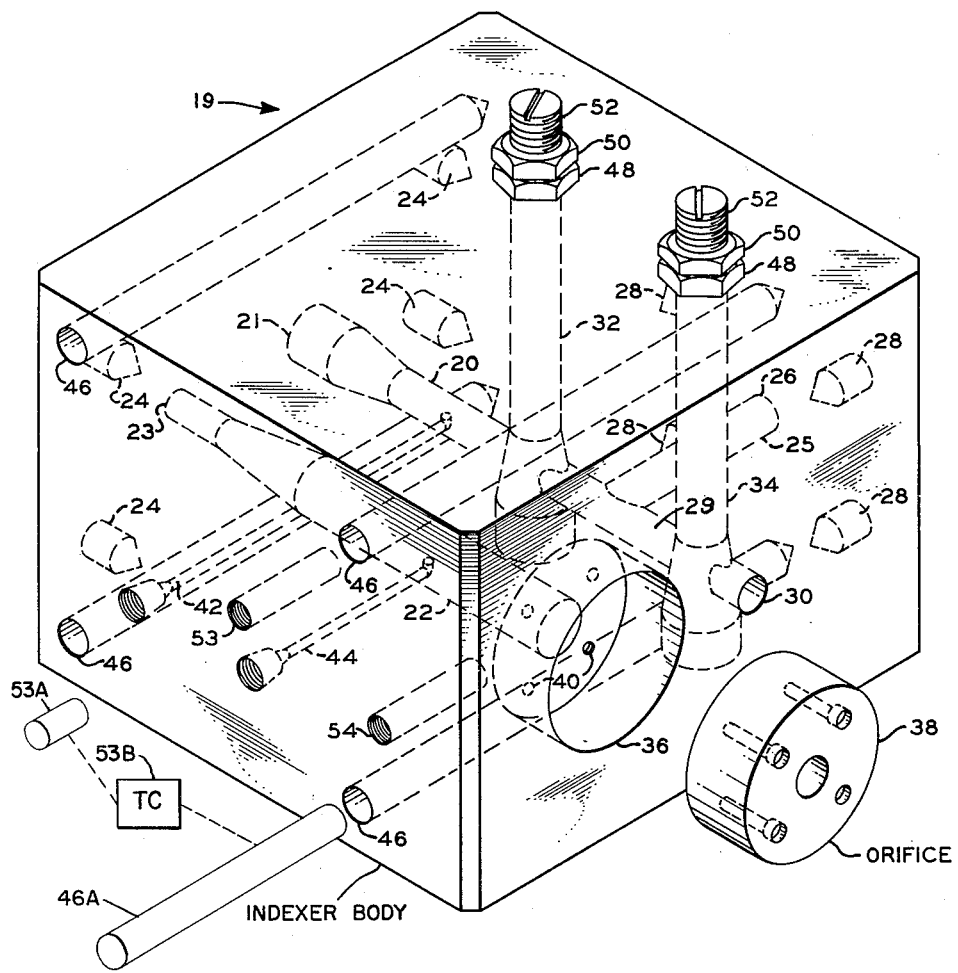

For the purpose of more clearly describing the invention and providing a better understanding thereof, reference is had to the accompanying drawings of which:

FIGURE 1 is a diagramatic illustration of apparatus comprising in series an extruder, a gear pump, a pressure recorder and an orifice, suitable for carrying out one embodiment of the invention, FIGURE 2 is a diagrammatic illustration of apparatus comprising an extruder, a gear pump, a tachometer for measuring the speed of the gear pump, a pressure recorder-controller and an orifice, suitable for carrying out another embodiment of the invention, FIGURE 3 is an isometric view of a single piece hexahedral apparatus, suitable for use in determining melt index, FIGURE 4 is a curve relating pump speed in r.p.m. with orifice pressure for various melt index polymers, FIGURE 5 is a curve relating ASTM melt index with orifice pressure for a constant pump r.p.m., and FIGURE 6 is a curve relating ASTM melt index with pump speed in r.p.m. at a fixed orifice pressure.

As used in the discussion of FIGURES 1–6, "orifice pressure" means the pressure upstream of an orifice discharging to atmospheric pressure.

The apparatus of FIGURE 1 comprises in series a hopper 2, adapted to feed an extruder 4, communicating through outlet conduit 6 with a gear pump 8, driven by a motor 10, said gear pump discharging through an orifice 12 to the atmosphere, and a pressure indicator 14 communicating with the pump discharge upstream of orifice 12.

In the operation of the apparatus of FIGURE 1, a polymer, for example a normally solid polymer of a 1-olefin, such as an ethylene polymer, is introduced to hopper 2 and passes into extruder 4 wherein it is masticated and thoroughly mixed. Molten polymer leaves the extruder through conduit 6 and enters the suction of gear pump 8 which is controlled by motor 10 to provide a constant fixed rate of flowing polymer. The molten polymer is discharged from the gear pump passing through orifice 12 and to the atmosphere. The polymer can be maintained at the desired temperature by conventional means, such as a direct or indirect heat exchanger (not shown). The pressure upstream of the orifice, which varies depending on the particular polymer being passed through the apparatus, is indicated by pressure indicator 14.

It has been found that if molten polymer is passed through an orifice at a predetermined temperature and at a constant rate the pressure upstream of the orifice is a function of the polymer melt index. An experimental correlation of this relationship is presented in FIGURES 4 and 5. The data presented in these figures were obtained by experimentally measuring pump speeds and orifice pressures for various melt index ethylene polymers, while passing said polymers through apparatus similar to that shown in FIGURE 1. The ethylene polymers utilized in carrying out the test were prepared by polymerizing ethylene in the presence of cyclohexane and catalyst comprising about 2.5% by weight of chromium as chromium oxide, containing hexavalent chromium, associated with silica-alumina, prepared by impregnation of the silica-alumina with chromium oxide, followed by drying and activation in dry air. A detailed description of the polymerization method employed and the catalyst used is contained in the patent of Hogan and Banks, U.S. 2,825,721. The conditions employed in preparing the various polymers tested were generally as follows:

| Reactor temperature, degrees | Reactor pressure, p.s.i.a. | Polymer concentration,[1] weight percent | Catalyst concentration,[1] weight percent |
| --- | --- | --- | --- |
| 270-320 | 500 | 8-10 | 0.2-0.4 |

[1] Based on cyclohexane diluent.

The resulting polymers, which had melt indexes varying from 0.66 to 5.0, were passed through a Zenith positive displacement gear pump (type HP-4647, manufactured by Zenith Product Co., West Newton 65, Massachusetts) then through an orifice having a diameter of 0.220 inch and a length of 0.821 inch and finally discharged to the atmosphere. During each of the runs, which were carried out at a temperature of 382° F. and at various pump speeds, the pressure upstream of the orifice was recorded. The resulting data were plotted and are presented in FIGURE 4. It is to be noted from this figure that each different melt index polymer provides a correlation curve between pump speed and the pressure upstream of the orifice.

From the data of FIGURE 4, it is possible to plot ASTM melt index versus orifice pressure for any desired pump speed. One correlation is presented in FIGURE 5, at a pump speed of 30 r.p.m. The selection of pump speed varies, depending on the particular pump which is being used. In this instance a speed of 30 r.p.m. was selected as being within the desired range of operation of the specific pump employed.

The data presented in FIGURES 4 and 5 can be utilized in conjunction with the operation of the apparatus of FIGURE 1 to provide a direct reading of melt index on pressure indicator 14. For example when employing a Zenith pump similar to that utilized in obtaining the data of FIGURES 4 and 5 and operating the pump at 30 r.p.m., numerical values representing ASTM melt index can be printed on pressure indicator 14 in the place of corresponding pressure values, the appropriate melt index values being obtained from the curve in FIGURE 5. The apparatus of FIGURE 1 then providese a continuous measurement and visual indication of the melt index of polymers being passed through the apparatus.

Another embodiment of the invention is presented in FIGURE 2. The apparatus of this embodiment is similar to the apparatus of FIGURE 1 except that a pressure recorder-controller 16 is substituted for pressure indicator 14. Controller 16 is utilized to control the speed of motor 10 and in turn the speed of the positive displacement pump 8 whereby a predetermined, constant pressure is provided upstream of orifice 12. In the operation of FIGURE 2, molten polymer at the desired temperature is again passed from extruder 4 through gear pump 8 and orifice 12. The flowing polymer produces a pressure upstream of the orifice which is proportional to the flow rate. This pressure actuates a pressure recorder controller 16, such as a Foxboro Model 40 Electric Controller (Foxboro Bulletin 5A-10A, Nov. 1955) which in turn transmits an electrical signal proportional to pressure to a motor speed control 17, such as a G. E. "Thy-Mo-Trol" controller (General Electric Apparatus Handbook, Book I, sheet 1125, pages 11-16, Feb. 5, 1951). This in turn controls the speed of motor 10 which drives gear pump 8. When the melt index of the flowing polymer varies the described control system operates to vary the pump speed and thereby maintain a constant pressure upstream of the orifice. Variations in the motor speed are measured and indicated by a tachometer 18.

When it is desired to read melt index directly from the tachometer, this instrument can be calibrated in accordance with FIGURE 6. As shown in this figure, ASTM melt index is a linear function of pump speed at a polymer temperature of 382° F. and a constant upstream orifice pressure of 43.6 p.s.i. This particular pressure corresponds to the pressure which is placed on the polymer by the piston in carrying out melt index measurements in accordance with ASTM D-1238-52T. The data in FIGURE 6 were obtained from FIGURE 4.

As a further embodiment of the invention a compact apparatus particularly suitable for measuring melt index is shown in FIGURE 3. This apparatus comprises a steel hexahedron 19 containing a passageway 20 opening at 21 in one vertical face and at 30 in the opposite vertical face, a second passageway 22 parallel to passageway 20 opening in one vertical face at 23 and in the opposite vertical face at 36, the opening 36 being enlarged to receive the removable orifice 38, a third passageway 25 perpendicular to and intersecting passageway 20, and opening into an adjacent vertical face at 26, a valve 32, having a larger, beveled lower section, in pasageway 20 between opening 21 and the intersection of passageways 20 and 25, a second similar valve 34 in passageway 20 near opening 30, each valve extending outside of block 19 and being held in said block by a nut 48 and locknut 50, each valve being slotted 52 to provide means for adjustment, tapped recessed means 24 for attaching positive displacement pumping means to said block whereby the suction and discharge respectively of said pumping means are aligned with openings 21 and 23, tapped recessed means 28 for attaching a source of flowing polymer to block 19 discharging to opening 26, tapped recessed openings 42 and 44 adapted for the insertion of pressure indicators for measuring presure upstream of said pumping means and orifice respectively, recessed openings 46 adapted for the insertion of heaters 46A, recessed opening 53 adapted to receive a temperature sensing means 53A connected to a thermostat 53B to control said heaters, opening 54 adapted for a thermometer to measure the temperature near the orifice inlet and tapped recessed openings 40 for attaching the removable orifice in opening 36.

In the operation of the apparatus of FIGURE 3 molten polymer is introduced to hexahedron 19 through inlet 26, passing through valve 32 and passageway 20 into a positive displacement pump (not shown), and being discharged from said pump through opening 23, passageway 22 and orifice 38 to the atmosphere. The flow of polymer may be greater than is desired for the measurement of melt index in which case excess polymer is bypassed around the pumping means through passageway 29, valve 34 and opening 30 to the atmosphere. The pressure upstream of orifice 38 is measured by a pressure gauge installed in opening 44. Control of the temperature of the polymer during its passage through the cube is provided by electrical bayonet-type heaters inserted in openings 46 and a thermostat inserted in opening 53. A visual indication of polymer temperature upstream of the orifice is given by a thermometer placed in opening 54. The apparatus of FIGURE 3 can be employed in conjunction with the apparatus combination of either FIGURE 1 or 2, and furnishes a compact, portable means for continuously measuring melt index, which due to its simplicity, durability and lack of moving parts, provides essentially trouble-free operation.

The preceding discussion has been directed to certain embodiments of the invention as is illustrated by FIGURES 1 to 6. This is not intended, however, in any limiting sense and it is within the scope of the invention to employ other suitable equivalent apparatus for carrying out the invention. Thus, it is within the scope of the invention to employ positive displacement pumping means other than gear pump, for example, a progressing cavity type pump. Also, it is within the scope of the invention by the use of suitable instrumentation to provide both a visual reading and a continuous recording of melt index utilizing the apparatus combinations of either FIGURES 1 or 2. Again it is within the scope of the invention to maintain the temperature of the apparatus of FIGURE 3 by confining said apparatus in a constant temperature atmosphere, such as a constant temperature bath. While the curves set forth in FIGURES 4 to 6 are directed specifically to solid ethylene polymers, the same relationships hold for polymers, particularly solid polymers and copolymers of 1-olefins, and it is within the scope of the invention generally to measure, indicate and record polymer melt index by the use of the apparatus described.

Having thus described the invention by providing specific examples thereof, it is to be understood that no undue limitations or restrictions are to be drawn by reason thereof and that many variations and modifications are within the scope of the invention.

I claim:

1. Apparatus comprising in combination and in series an extruder discharging flowing polymer into a conduit, said conduit in open communication with a positive displacement pump and containing a flow restriction means downstream from said pump; flow control means disposed so as to control the flow rate through said conduit; temperature sensing means disposed in said conduit; heating means disposed so as to heat said conduit; temperature control means operably connected to said temperature sensing means and said heating means for maintaining said conduit at a substantially constant temperature; pressure sensing means disposed in said conduit upstream of said flow restriction means and means for indicating the pressure of the flowing polymer calibrated to read in melt index operably connected to said pressure sensing means.

2. Apparatus comprising in combination a source of molten polymer discharging into a conduit; a positive displacement pump for moving said polymer through said conduit; flow restriction means in said conduit downstream from said pump; a pressure sensing means disposed in said conduit upstream from said flow restriction means; means for varying the speed of the driving means of said pump; a pressure recorder-controller operably connected to said pressure sensing means and said means for varying the speed of said driving means so as to control the polymer flow rate through said positive displacement pump to provide a constant pressure in the flowing stream; and a tachometer operably connected to said driving means for indicating the rate of flow of polymer through said positive displacement pump.

3. The apparatus of claim 2 in which said tachometer is calibrated in accordance with FIGURE 6 to read in melt index.

4. Apparatus for measuring polymer melt index comprising, in combination, a source of flowing polymer; a positive displacement pump having an inlet and outlet; a pressure sensing means; a member having a first restricted passageway therethrough; and a single piece polyhedron having a second internal restricted passageway and an inlet in a face thereof in open communication with said source; a third interior restricted passageway in open communication with the outlet to said second passageway and having an outlet in one face of said polyhedron in open communication with said pump inlet, a fourth interior restricted passageway having an inlet in a face thereof in open communication with said pump outlet and an outlet in a recessed portion of said polyhedron, said recessed portion adapted to receive said member so as to align said first and fourth passageways, said first passageway thereby comprising the terminal of the flow path of the polymer through the apparatus, a fifth internal restricted passageway in open communication with said fourth passageway upstream from said member and having an outlet in communication with said pressure sensing means, and said polyhedron being adapted to receive a heating means.

5. The apparatus of claim 4 wherein valve means are disposed in said third passageway intermediate the outlet thereto and the intersection with said second passageway to regulate flow therethrough.

6. The apparatus of claim 4 wherein said polyhedron is adapted to receive temperature sensing means and a temperature controller is operably connected to said temperature sensing means and said heating means so as to provide a substantially constant temperature polymer flowing through said apparatus.

7. Apparatus for measuring polymer melt index comprising in combination a source of flowing polymer; a positive displacement pump having an inlet and outlet; a pressure sensing means; a member having a first restricted passageway therethrough; and a single piece polyhedron having a second internal restricted passageway and an inlet in a face thereof in open communication with said source; a third interior restricted passageway in open communication with the outlet to said second passageway and having an outlet in one face of said polyhedron in open communication with said pump inlet, a first valve means disposed in said third passageway intermediate the outlet thereto and the intersection with said second passageway to regulate flow therethrough, a bypass internal restricted passageway having an outlet in one face of said polyhedron and an inlet in open communication with said third passageway, a second valve means disposed in said bypass passageway to regulate flow therethrough, a fourth interior restricted passageway having an inlet in a face thereof in open communication with said pump outlet and an outlet in a recessed portion of said polyhedron, said recessed portion adapted to receive said member so as to align said first and fourth passageways, said first passageway thereby comprising the terminal of the flow path of the polymer through the apparatus, a fifth internal restricted passageway having an inlet in open communication with said fourth passageway upstream from said member and having an outlet in communication with said pressure sensing means, said polyhedron adapted to receive means for heating said polyhedron.

8. The apparatus of claim 7 wherein said means for heating comprises at least one additional internal restricted passageway in said polyhedron adapted to receive said heating means.

9. Apparatus for measuring polymer melt index comprising in combination an extruder discharging flowing polymer; a positive displacement pump having an inlet and outlet; flow control means operably connected to the pump actuating means for controlling the flow rate through the hereinafter described recessed portion; a pressure sensing means; a pressure recording means calibrated in units of melt index in communication with said pressure sensing means; a member having a first restricted passageway therethrough; a single piece hexahedron; means for attaching said extruder to a first face of said hexahedron; means for attaching said pump to a second face of said hexahedron adjoining said first face; said hexahedron having a second internal restricted passageway and an inlet in said first face in open communication with said extruder; a third interior restricted passageway in open communication with the outlet to said second passageway and having a first outlet in said second face in open communication with said pump inlet and a second outlet in a third face of said hexahedron opposite said second face; a first valve means disposed in said third passageway intermediate said first outlet and the intersection with said second passageway and operably connected to a first controlling means exterior of said hexahedron to regulate flow therethrough; a second valve means disposed in said third passageway intermediate said second outlet and said intersection and operably connected to a second controlling means exterior of said hexahedron to regulate flow therethrough; a fourth interior restricted passageway having an inlet in said second face in open communication with said pump outlet and an outlet in a recessed portion of said third face, said recessed portion adapted to receive said member so as to align said first and fourth passageways, said first passageway thereby comprising the terminal of the flow path of the polymer through the apparatus; a fifth internal restricted passageway in open communication with said fourth passageway upstream from said member and having an outlet in communication with said pressure sensing means; at least one additional internal restricted passageway adapted to receive heating means; and temperature controlling means operably connected to said heating means and a temperature sensing means which is in communication with the interior of said hexahedron upstream of said recessed portion to maintain the temperature of said hexahedron substantially constant.

10. The apparatus of claim 9 wherein said pressure recording means is calibrated in accordance with FIGURE 6.

11. The apparatus of claim 9 wherein said means for controlling flow comprises the driving means of said pump and the speed thereof is varied to maintain a substantially constant pressure.

12. The apparatus of claim 11 wherein said variations in speed of said pump are measured and indicated by a tachometer.

13. The apparatus of claim 12 wherein said tachometer is calibrated in accordance with FIGURE 6.

References Cited in the file of this patent

UNITED STATES PATENTS

| | | |
|---|---|---|
| 1,848,928 | Beckstom et al. | Mar. 8, 1932 |
| 2,023,309 | Cheney et al. | Dec. 3, 1935 |
| 2,045,548 | Dillon et al. | June 23, 1936 |
| 2,696,374 | Brunstrum et al. | Dec. 14, 1954 |

FOREIGN PATENTS

| | | |
|---|---|---|
| 681,197 | Great Britain | Oct. 22, 1952 |